May 11, 1937.   M. PERIAT ET AL   2,080,227
WHEEL BALANCER
Filed Sept. 23, 1935
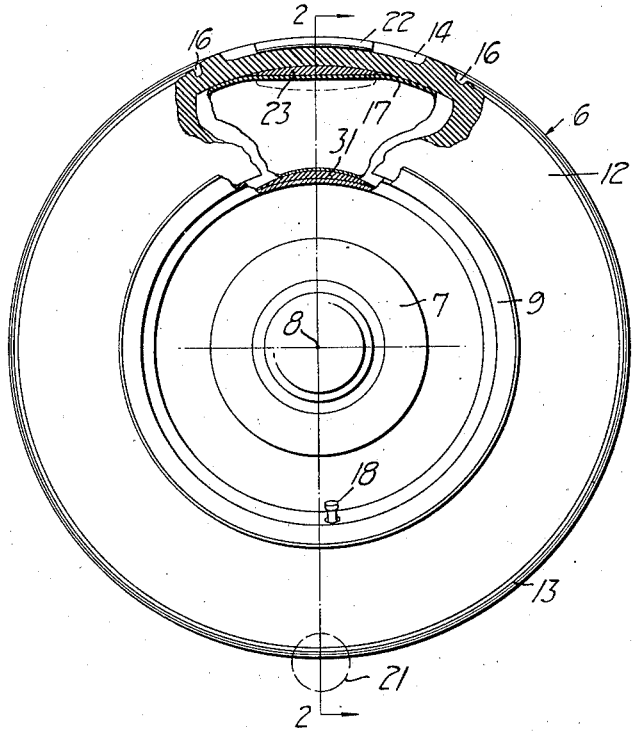
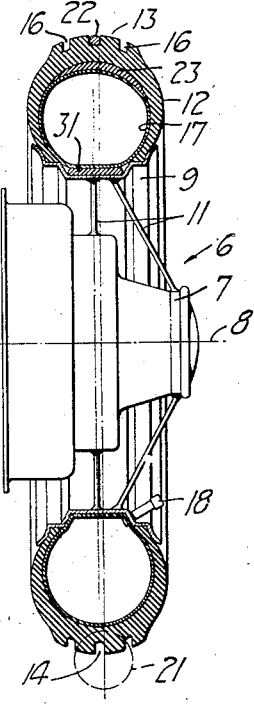
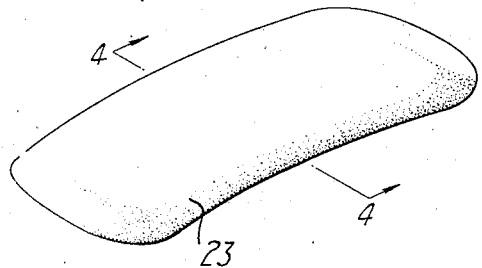
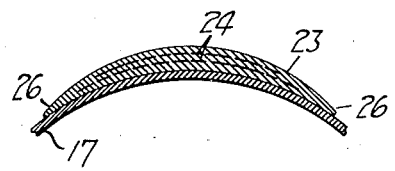
INVENTORS
Marcel Periat
Roscoe E. Burke
BY Marcus Lothrop
ATTORNEY.

Patented May 11, 1937

2,080,227

UNITED STATES PATENT OFFICE 2,080,227

WHEEL BALANCER

Marcel Periat, San Mateo, and Roscoe E. Burke, San Jose, Calif.

Application September 23, 1935, Serial No. 41,754

6 Claims. (Cl. 301—5)

Our invention relates to the static and dynamic balancing of rotating bodies and is more especially concerned with the static and dynamic balancing of an automobile wheel assembly. A wheel assembly is composed of the rotatable wheel itself, upon which is mounted a road-contacting tire casing usually of flexible but relatively stiff material and within which is a relatively flexible inner tube for containing the air. As automobile speeds of operation have increased, and as increasing attention has been paid to comfort and smoothness of operation, it has become increasingly necessary to provide extraordinarily close balancing of the rotating parts of the machine. The wheel assemblies, being composite structures (including the wheel itself, the tire casing and the tube), have come in for their share of attention. Additional care in manufacture of all of these units has reduced the amount of unbalance to within relatively small limits, and balancing weights have been applied to the wheel, usually on the wheel rim. These means in many cases assist materially in reducing the unbalance of the assembly but in many cases still leave disturbing unbalanced masses. This is often due to the fact that such balance weights as are applied to the wheel rim are in a fixed axial location so that they can play no part in counteracting dynamic unbalance. This is particularly serious since it cannot ordinarily be detected by static balancing means and since rocking couples which remain because of such unbalance are increasingly serious as the speed of rotation of the wheel assembly increases.

It is therefore an object of our invention to provide a wheel balancer which is effective to balance a wheel assembly within extraordinarily close limits.

A further object of our invention is to provide a wheel balancer which is effective in reducing dynamic unbalance.

Another object of the invention is to provide balancing means which can be located near the periphery of the wheel assembly.

An additional object of our invention is to provide a wheel balancer which can be used with the many types of present-day wheel construction.

A still further object of our invention is to provide a method of reducing the static and dynamic unbalance of a wheel assembly.

The foregoing and other objects are attained in the embodiment of the invention illustrated in the drawing, in which—

Fig. 1 is a side elevation of a typical wheel assembly, a portion of the upper part of the tire casing and tube being broken away to show the parts in cross-section on a central plane.

Fig. 2 is a cross-section the plane of which is indicated by the line 2—2 of Fig. 1.

Fig. 3 is a perspective view of a flexible pad utilized in the course of our invention.

Fig. 4 is a cross-section through the pad, the plane of section being indicated by the line 4—4 of Fig. 3.

In its preferred form the wheel balancer of our invention is for use in conjunction with a wheel assembly which includes a wheel, a tire casing mounted on the wheel and an inner tube within the casing, and it comprises a flexible pad, usually of rubber, which is of such a weight and is so applied within the tire casing and preferably on the inner tube as substantially to neutralize both the static and the dynamic unbalance of the wheel assembly. The method contemplates determining first the static and dynamic unbalance of the wheel assembly, and then applying within the tire casing a counterbalancing weight so as to produce an assembly which is substantially in static and dynamic balance.

While our invention can be incorporated in many environments, it is especially applicable for use in connection with automotive vehicle wheel assemblies. Such an assembly includes a wheel 6 having a central hub 7 mounted in a suitable fashion for rotation about a main rotational axis 8. The wheel likewise incorporates a rim 9. This is customarily connected to the hub by spokes 11 or a suitable intermediate web. Also incorporated in the wheel assembly is a tire casing 12, customarily fabricated of a composite construction including textile material and rubber, the casing being somewhat flexible and having on its periphery a suitable non-skid pattern 13 which usually includes a plurality of grooves, such as a central groove 14 and side grooves 16.

Within the casing 12 is disposed an inner tube 17 usually of rubber and provided with a valve stem 18 piercing the rim 9 and connected to the inner tube for supplying air thereto. In accordance with present practice the inner tube 17 and the casing 12 are roughly balanced in manufacture and are usually so marked that they can be assembled on the wheel 6 in such a fashion as to provide a minimum unbalance. This minimum so attained still includes considerably more unbalance than should be permitted for satisfactory wheel assembly operation at high speed. It is probably true that the actual weight which is misplaced and which produces the unbalance is itself relatively small, but the effect of such weight is materially multiplied as the speed of rotation of the wheel assembly increases. The unbalance which exists after the proper assembly of the casing 12 and the inner tube 17 on the wheel is represented in the figures by a dashed circle 21 which indicates a concentrated weight equivalent in weight and location to the distributed unbalanced weight of the assembly.

In accordance with our invention, the location and magnitude of the unbalanced weight 21 is first determined. This is done by mounting the wheel on any suitable balancing machine, of which there are several standard kinds and which are capable of giving an indication of the location and amount of the unbalanced weight.

Another method of providing a close approximation of the reading of such a balancing machine is to mount the entire wheel assembly for rotation, and first to balance the wheel statically, that is to say, to permit it to come to rest without restraint. The lowest average point after several such trials is taken as the heaviest point and as the location of the unbalanced weight 21. To determine the magnitude of such weight we can, for example, apply a length of lead rod 22 with a temporary retainer, at a point on the casing periphery opposite to the apparent location of the unbalanced weight 21. The mass or weight of the rod 22 is selected at random, and changes in its location and weight are made (by cutting off portions or by substituting other rods) until such time as the wheel stops at any random, indeterminate point without in any wise returning to a single definite point each time. The wheel is then in reasonably close static balance. If the wheel is then rapidly rotated it can be watched for the development of a rocking couple which tends to oscillate the wheel in the plane of the rotational axis 8. The rod 22 can, when the wheel is stopped, then be moved to first one of the side grooves 16 and then the other, the wheel in each instance being operated to observe in which groove the rocking couple is diminished or eliminated. This determination affords a very close approximation of the amount of counterbalancing weight necessary and its particular location to achieve a general static and dynamic balance of the entire wheel assembly.

In order to provide a permanent counterbalancing weight to neutralize the unbalanced weight so determined, we preferably provide a pad 23, such as shown in Figs. 3 and 4, which is generally of concavo-convex cross-section, both transversely and longitudinally, and is preferably composed of rubber similar in character to the material of the inner tube 17, although there may be one or more reinforcing fabric layers 24 included in the pad. The thickness of the pad varies somewhat, and preferably the entire margin of the pad is tapered or feathered, as at 26, in order to provide a smooth merger with the tube 17. This flexible pad 23 is preferably disposed within the casing 12 and is vulcanized or otherwise cemented or fixed to the inner tube 17 in such a location as to neutralize the weight 21. As indicated in Fig. 2, this location is usually in the same rotational plane as the weight 21 and diametrically opposite thereto on the wheel assembly. The mass or weight of the pad 23 is of course carefully selected or chosen so that the indicated unbalanced weight 21 will be quantitatively offset.

When this counterbalancing pad has been applied it in no wise interferes with the normal operation of the wheel assembly but places it as closely as commercially feasible in static and dynamic balance. It is especially to be emphasized that the pad may be, but need not be, located on the center line of the wheel, since as shown in Fig. 2 a case has been chosen in which the pad is somewhat offset towards the outside of the wheel assembly from the central position in order to balance dynamically the unbalanced weight 21 which likewise is shown displaced towards the side of the valve stem 18. The necessary weight of the pad 23 is relatively small, since the pad is applied adjacent the periphery of the wheel assembly wherein its effect is principally felt. It likewise has no direct connection with the particular construction of the wheel 6 and consequently can be applied to any type of wheel. It is flexible, so as not to interfere with the general flexibility of the assembly, and it is easily applied by anyone familiar with tire construction and repair.

Also shown in Figs. 1 and 2 is a pad 31 which is usually utilized in place of the pad 23 although both can be utilized simultaneously. The pad 31 is in most respects similar to the pad 23 but is intended for application between the tube 17 and the rim 9. It can be cemented or vulcanized to the tube or to the rim, and in the latter case is especially effective in assisting in balancing the wheel itself.

As a further modification and particularly if a group of wheel assemblies are all subject to substantially the same unbalance, it is feasible to manufacture the inner tube 17 with a thickened and heavier wall in the appropriate region to provide an in-built counterbalance, or conversely to provide a somewhat thinner and lighter wall in the appropriate zone.

We claim:

1. A wheel balancer for a rotatable wheel, a tire casing on said wheel, a tube within said casing, comprising a flexible pad attached to said tube, said pad having a substantial mass and being located to neutralize static and dynamic unbalance of the wheel, casing and tube assembly.

2. A wheel balancer for an assembled rotatable wheel, tire casing and tube, comprising means applied to said inner tube in such a location and of such a weight as to neutralize static and dynamic unbalance of the assembly.

3. A wheel balancer comprising a rubber pad incorporated with an inner tube, said pad having a weight and being located so as substantially to offset unbalance of the wheel assembly in which said tube is used.

4. A wheel balancer for an assembled rotatable wheel, tire casing and tube, comprising a rubber pad disposed within the space enclosed by said casing and the rim of said wheel, said rubber pad being fast on said tube and in such a location and of such a weight as to neutralize static and dynamic unbalance of the assembly.

5. A wheel balancer for use with an assembled wheel, casing and inner tube, comprising a flexible rubber pad vulcanized onto said inner tube, said pad having a weight and location to counterbalance static and dynamic unbalance of said assembled wheel, casing and inner tube.

6. A wheel balancer comprising an inner tube adapted to be assembled with a wheel and a tire casing, and a flexible rubber pad vulcanized onto said inner tube, said pad having a weight and location to balance statically and dynamically the assembled inner tube, casing and wheel.

MARCEL PERIAT.
ROSCOE E. BURKE.

DISCLAIMER 2,080,227.—*Marcel Periat*, San Mateo, and *Roscoe E. Burke*, San Jose, Calif. WHEEL BALANCER. Patent dated May 11, 1937. Disclaimer filed November 23, 1940, by the patentees.

Hereby enter this disclaimer to claim 3 in said specification.

[*Official Gazette December 31, 1940.*]